(12) United States Patent
Jousse

(10) Patent No.: US 8,489,285 B2
(45) Date of Patent: Jul. 16, 2013

(54) CONTROL DEVICE AND METHOD FOR TRIGGERING PERSONAL PROTECTION MEANS FOR A VEHICLE

(75) Inventor: Alain Jousse, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 408 days.

(21) Appl. No.: 12/740,237

(22) PCT Filed: Sep. 26, 2008

(86) PCT No.: PCT/EP2008/062921
§ 371 (c)(1),
(2), (4) Date: Apr. 28, 2010

(87) PCT Pub. No.: WO2009/065655
PCT Pub. Date: May 28, 2009

(65) Prior Publication Data
US 2010/0262340 A1    Oct. 14, 2010

(30) Foreign Application Priority Data

Nov. 19, 2007  (DE) .......................... 10 2007 055 123

(51) Int. Cl.
*B60R 21/017*  (2006.01)
*G06F 19/00*  (2006.01)

(52) U.S. Cl.
USPC ................................ 701/45; 701/46; 280/735

(58) Field of Classification Search
USPC   361/249, 251; 701/45, 46; 280/735; 180/274
See application file for complete search history.

(56) References Cited

U.S. PATENT DOCUMENTS

| | | | | |
|---|---|---|---|---|
| 3,513,355 | A * | 5/1970 | Shanks | 361/249 |
| 4,214,171 | A * | 7/1980 | Gyori | 307/39 |
| 4,419,933 | A * | 12/1983 | Kirby et al. | 102/206 |
| RE34,637 | E | 6/1994 | Burger et al. | |
| 5,357,141 | A * | 10/1994 | Nitschke et al. | 307/10.1 |
| 5,432,385 | A * | 7/1995 | Kincaid et al. | 307/10.1 |
| 5,513,878 | A * | 5/1996 | Ueda et al. | 280/735 |
| 5,631,834 | A | 5/1997 | Tsurushima et al. | |
| 6,072,246 | A * | 6/2000 | Schafer | 307/10.1 |
| 6,220,628 | B1 * | 4/2001 | Konja | 280/735 |
| 6,341,252 | B1 * | 1/2002 | Foo et al. | 701/45 |
| 6,456,915 | B1 | 9/2002 | Fendt et al. | |
| 6,549,836 | B1 * | 4/2003 | Yeh et al. | 701/45 |

FOREIGN PATENT DOCUMENTS

| | | |
|---|---|---|
| DE | 44 09 019 | 9/1994 |
| WO | 99/44 867 | 9/1999 |

OTHER PUBLICATIONS

International Search Report in Internatoional Application No. PCT/EP2008/062921 dated Jan. 29, 2009.

* cited by examiner

*Primary Examiner* — Tan Q Nguyen
(74) *Attorney, Agent, or Firm* — Kenyon & Kenyon LLP

(57) ABSTRACT

A control device and a method for triggering personal protection arrangement for a vehicle are provided, an energy reserve supplying electrical energy for the triggering. A control circuit is provided, which, as a function of the personal protection arrangement to be triggered, forms from the electrical energy at least one individual firing pulse for triggering the individual personal protection arrangement, with respect to a first firing pulse amplitude and a first firing pulse duration.

8 Claims, 3 Drawing Sheets

CONTROL DEVICE AND METHOD FOR TRIGGERING PERSONAL PROTECTION MEANS FOR A VEHICLE

FIELD OF THE INVENTION

The present invention relates to a control device and a method for triggering a personal protection arrangement for a vehicle.

BACKGROUND INFORMATION

U.S. Pat. No. 5,631,834 A discusses providing a time control of the energy supply to a firing element. Toward this end, the energy reserve voltage is sampled and the sampling values are summed up and compared with a limit value. If the limit value is exceeded, then the instant of this exceedance of the limit value constitutes the time that is used to apply firing energy to the firing element.

SUMMARY OF THE INVENTION

In contrast, the control device according to the present invention and the method according to the present invention for triggering a personal protection arrangement, having the features of the independent claims, offer the advantage that the firing pulse amplitude and the firing pulse duration of the firing pulse are now formed as a function of the personal protection arrangement to be controlled. This makes it possible to reduce the energy reserve capacity because the firing energy is used more efficiently according to the exemplary embodiments and/or exemplary methods of the present invention. The crash scenario determines, for instance, which personal protection arrangement is to be triggered and at what particular time as a result of the triggering decision based on the severity and the type of crash. According to the present invention, this crash scenario is used to form the firing pulses for the particular personal protection arrangement, in such a way that an optimal use of the energy at the firing instant is achieved. In an energy-efficient manner, this makes it possible, for example, to use a large but brief voltage pulse at the start of firing, and a lower but broader and thus more voltage-efficient voltage pulse as firing pulse in the downstream personal protection arrangement. This optimally considers the discharge of the energy reserve during the triggering of the personal protection arrangement.

In control devices, the firing is normally realized from an energy reserve, i.e., one or more capacitors. The energy reserve voltage, i.e., the voltage at the energy reserve, drops during the firing operation because energy is drained for firing the personal protection arrangement, e.g., the airbags, also multi-stage airbags, belt tighteners, crash-active head rests or pedestrian protection arrangement. The present invention adapts itself to this behavior in an ideal manner and optimally utilizes the energy in the energy reserves in this way.

In the case at hand, the control device is an airbag control device, for example, or a safety control device, which usually has a housing made of metal and/or plastic. The components of the control device are then accommodated inside the housing. It is possible to provide a variant of a control device without housing.

Triggering in this context means the activation of the personal protection arrangement.

As explained earlier, the energy reserve is required for the autarkic operation of the control device, i.e., when the battery voltage fails as a result of an accident, for example. The energy reserve is made up of one or a plurality of capacitors or other suitable energy stores. The energy reserve therefore has the function of providing the electrical energy for the triggering. In an autarkic operation, however, functions other than the triggering of the personal protection arrangement must be supplied with the residual energy as well, which then also comes from this energy reserve. It is also possible to supply the control device from the energy reserve during normal operation.

As known, the electrical energy is present in the capacitor, the energy store or an inductive energy store, for example, possibly also indirectly, in a fuel cell.

The control circuit is an electrical circuit, which, for example, may be realized on an integrated switching circuit and/or with the aid of discrete components. The control circuit may also be implemented partially or entirely in the form of software in conjunction with a processor.

In the case at hand, the time is the elapsed time, such as the time from the beginning of the firing process of the personal protection arrangement, for example. The voltage is measured at the energy reserve, using methods for voltage measurements known to one skilled in the art.

The at least one firing pulse is applied to the firing element, i.e., the explosive charge, and is meant to result in the explosion of this firing element so that the subsequent gas development causes the airbag to inflate. The firing pulse thus is used for the triggering. In the case at hand, it is formed with regard to its firing pulse amplitude and its firing pulse duration from the electrical energy. The firing pulse amplitude may be specified by a corresponding load of the energy reserve as energy source, but also by other methods such as clipping etc.

The firing pulse duration is specified by the actuation of an electronic switch, e.g., a transistor switch.

The measures and further refinements allow advantageous improvements of the control device and the method for triggering personal protection arrangement for a vehicle as recited in the independent claims.

It is advantageous that the firing pulse amplitude is high at the beginning, i.e., in a first time interval of the triggering operation, whereas the firing pulse duration is short. In a second time interval, the firing pulse amplitude then is lower and the firing pulse duration longer. This allows the utilization of the energy from the energy reserve, in particular. In the first interval, one or a plurality of personal protection arrangement is able to be triggered. The second interval, too, may trigger one or a plurality of personal protection arrangement. The term time interval must therefore be interpreted very broadly, the terms of firing pulse amplitude and firing pulse duration being self-explanatory.

In addition, it is advantageous that the control circuit includes data that specify the first and the second time interval. Such data are permanently stored, e.g., in an EEPROM store of the control circuit. However, the control circuit may also receive these data from a computer and therefore provide only buffer storage, the permanent memory being assigned to this computer. Programming of the triggering may thus take place a priori on the basis of these data. In addition, however, the data may also advantageously assign the first and the second time interval to a different personal protection arrangement a priori. The data are able to be generated as a function of the triggering decision, in particular, because the triggering decision in the crash at hand indicates which personal protection arrangement are to be triggered and at what time. This is the crash scenario. Stored combinations of firing pulses, for example, may then be used as data for the individual crash scenarios.

Exemplary embodiments of the present invention are illustrated in the drawing and explained in greater detail in the following description.

DETAILED DESCRIPTION

Figure 1:
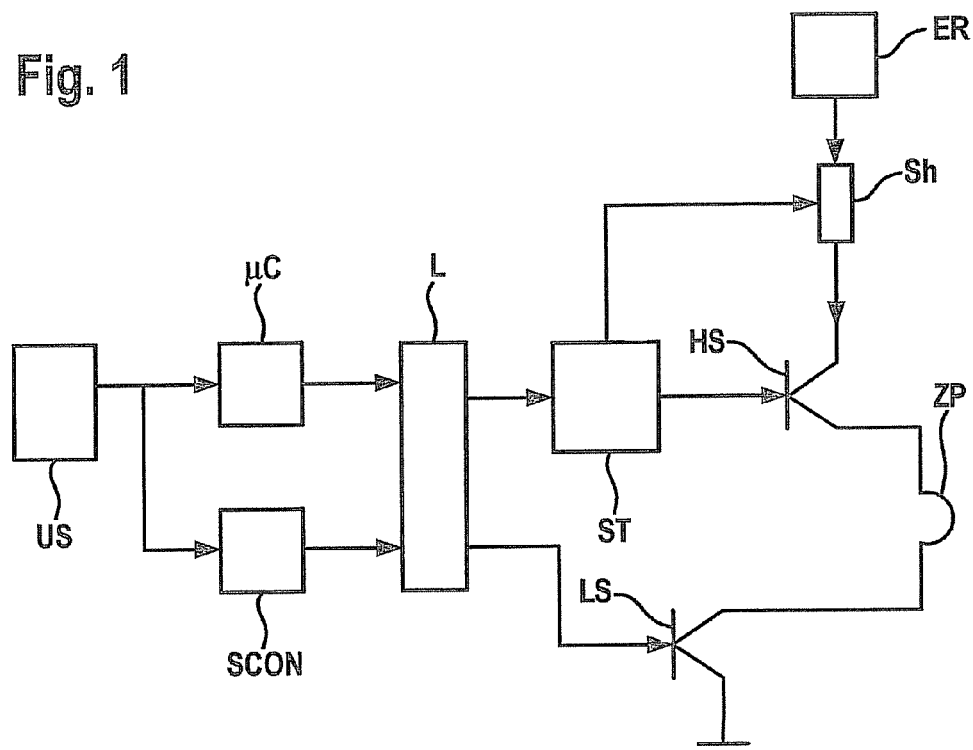
FIG. 1 shows a block diagram of the control device of the present invention.

FIG. 1 shows a simplified block diagram of the control device of the present invention. In the case at hand, only the components necessary to gain an understanding of the present invention are shown. Other components required for operating the control device but not contributing to an understanding of the present invention have been omitted for the sake of simplicity.

A microcontroller µC receives crash sensor signals from a crash sensor system US. Crash sensor system US may be accommodated inside and/or outside of the control device and, for example, include acceleration sensors, structure-borne noise sensors, air pressure sensors and/or environment sensors. However, parallel to microcontroller µC, which calculates a complex evaluation algorithm, the crash sensor signals are also evaluated by a safety component SCON. This component evaluates the crash sensor signals in a less complex manner, but safety component SCON is used as independent hardware path for the evaluation of the crash sensor signals in comparison with microcontroller µC.

Microcontroller µC and safety component SCON forward the results of their evaluation to a logic component L, which is already part of the firing circuit control. The transmission from microcontroller µC to logic component L may take place via the so-called SPI bus (serial peripheral interface bus), for example. In addition to the microcontroller, other types of processors are usable as well.

Logic component L then links the results of microcontroller µC and safety component SCON in such a way that it is specified thereby whether, when and which personal protection arrangement is to be triggered. Logic component L may be part of an integrated switching circuit in which output stages HS and LS may be integrated as well. Output stage HS, or high side, is a power transistor, which is switched through in order to supply firing energy to firing element ZP. Firing element ZP is an explosive charge, which is assigned to a personal protection arrangement such as an airbag.

Output stage LS, also known as low side, is switched through so that this firing energy is able to drain to ground. However, the firing energy is supplied by energy reserve ER, which is an electrolytic capacitor in the case at hand. Energy reserve ER is recharged from the car battery, for instance via components that are not illustrated, to a high voltage level between 20 and 40 V, for example.

Control circuit ST, which may also be part of an IC, forms a firing pulse from the firing energy in the manner of the present invention, and specifies the firing pulse duration and firing pulse amplitude. For this, control circuit ST utilizes data from logic component L. The data indicate for the particular crash scenario at what time the particular personal protection arrangement are to be fired and which firing pulse to use. Control circuit ST is directly connected to the firing circuit via a shunt resistor Sh in order to be able to measure the firing energy as well.

The firing pulse(s) formed in this manner are then routed to firing element ZP via the high side, where the firing is induced, the current being discharged to ground via low side LS.

A high firing pulse amplitude and a short firing pulse duration may be specified for the firing pulse in a first time interval, and a lower firing pulse amplitude but therefore longer firing pulse duration are specified in a second time interval following the first time interval.

Here, only a single firing circuit is shown symbolically. According to the exemplary embodiments and/or exemplary methods of the present invention, a plurality of firing circuits is to be provided, which also constitutes the standard case, in order to trigger different types of personal protection arrangement. Different types of personal protection arrangement also include multiple stages of an airbag or belt tightener. It is also possible to provide more than the illustrated two output stages. Other variants known to one skilled in the art are possible as well in this context.

Figure 2:
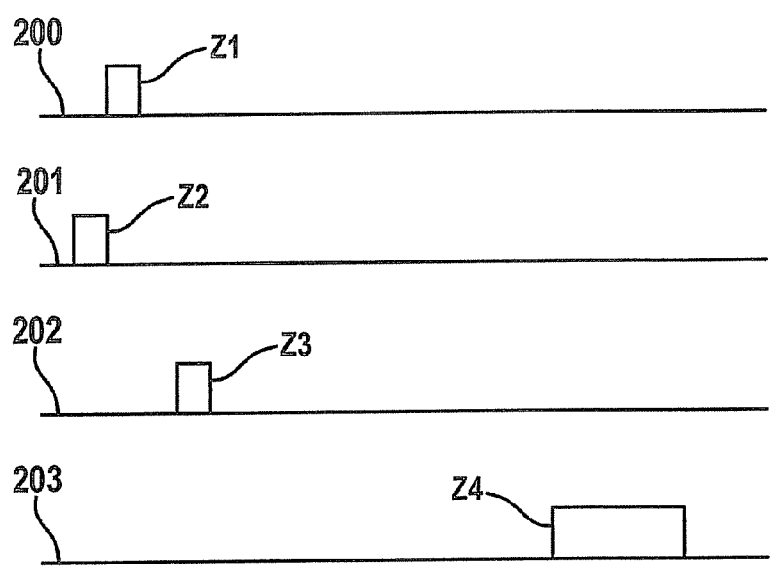
FIG. 2 shows a combination of firing pulses for a crash scenario.

FIG. 2 explains the sequence of the firing pulses according to the present invention in a time chart for a plurality of firing circuits 200-203. The triggering decision or data fixedly specified determine which firing pulses are to be output to the particular firing elements of to the individual firing circuits, and at what time. At a first instant, firing pulses Z1 and Z2 are generated in firing circuits 200 and 201. These firing circuits 200 and 201 are provided for pyrotechnical belt tighteners, for instance. Firing pulses Z1 and Z2 are implemented in an energy-efficient manner, i.e., the firing pulse amplitude is high in the present case, but the firing pulse width is short. In a second time interval, another firing pulse Z3 which is identical to firing pulses Z1 and Z2 is generated in firing circuit 202, this firing circuit being the first airbag stage of an airbag, for example. In a third time interval, firing pulse Z4, which is broader but lower than firing pulses Z1-Z3, is generated in firing circuit 203. This firing pulse Z4 is voltage-efficient in order to take the lower voltage at energy reserve ER into account.

Figure 3:
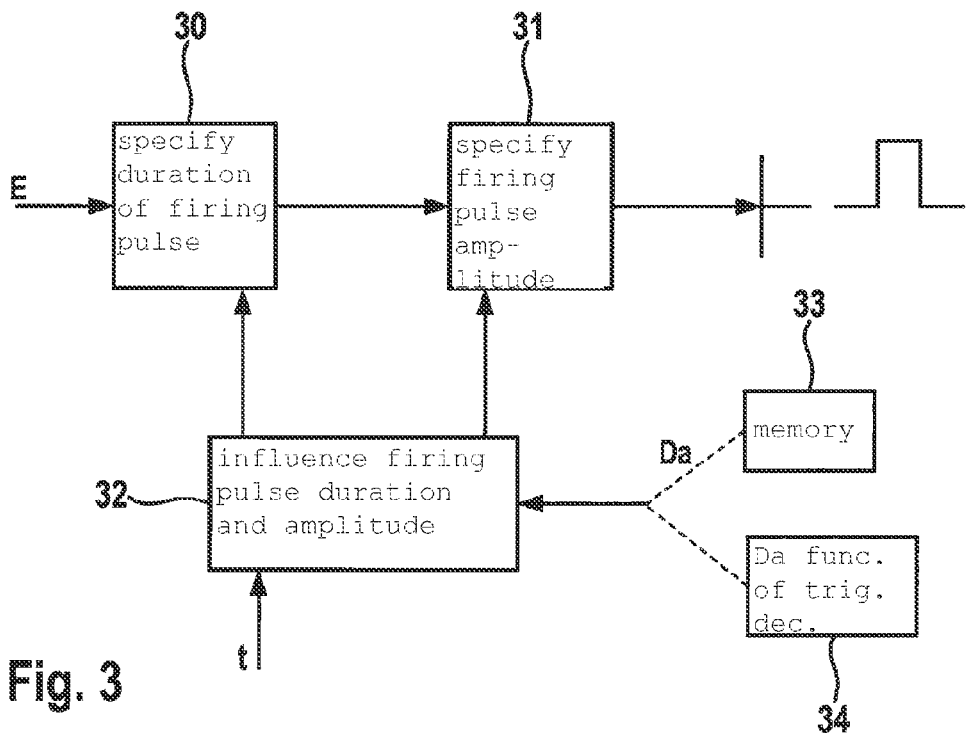
FIG. 3 shows a signal flow chart for the control circuit.

FIG. 3 explains the function of control circuit ST in a signal flow chart. Electrical energy E enters block 30, in which the duration of the application of the firing pulse to the firing element is specified. The firing pulse duration is specified via block 32, which receives as input data time t and data DA and influences the duration value based on these inputs. Data Da indicate which firing pulses are to be applied to the particular firing circuits and at what time. Data Da are either stored in memory 33 or specified a priori; data Da are generated as a function of the triggering decision in block 34. The pulse shapes are stored in control circuit ST, for example. After specification of the firing pulse duration, the firing pulse amplitude is defined in block 31. Here, too, block 32 influences this value by its input variables just mentioned.

The pulse amplitude lies between 1 and 2 A, while the pulse width lies between 0.5 and 2 ms.

Figure 4:
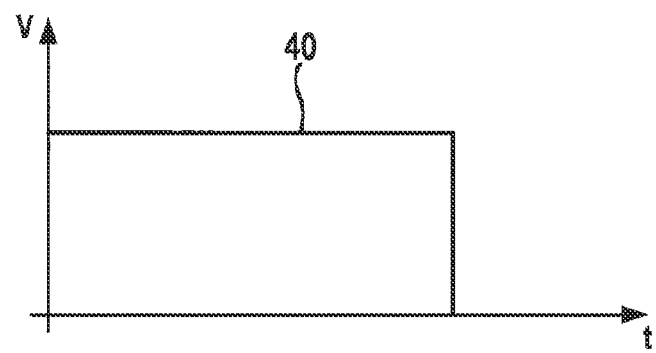
FIG. 4 shows a voltage-time diagram.

FIG. 4 shows a voltage-time diagram, the voltage being measured at the energy reserve. Curve 40 describes the slow drop of the voltage at the energy reserve over the time, this drop being caused by an energy withdrawal from the energy reserve. The exemplary embodiments and/or exemplary methods of the present invention utilizes this behavior in an efficient manner for an optimal use of the energy.

Figure 5:
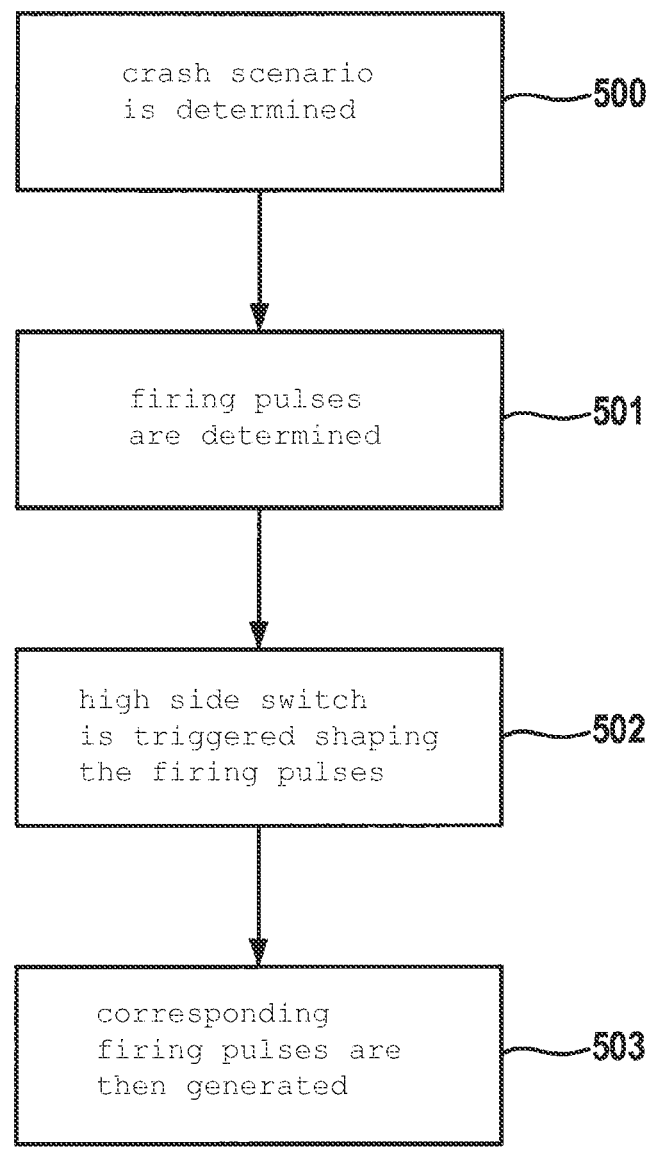
FIG. 5 shows a flow chart for the method according to the present invention.

FIG. 5 shows a flow chart with the method according to the present invention. In method step 500, the crash scenario is determined on the basis of the triggering decision or a priori.

The crash scenario indicates which personal protection arrangement are to be triggered and at what time. The required form of the particular firing pulses for the individual firing circuits results from this. These firing pulses are determined in method step 501, the shape of the firing pulses having been defined a priori, so that the energy reserve is optimally set up with regard to its capacity.

In method step 502, the high side switch is triggered, the corresponding shaping of the firing pulses being brought about by this triggering. In method step 503, the corresponding firing pulses are then generated in the individual firing circuits.

What is claimed is:

1. A control device for triggering a personal protection arrangement for a vehicle, comprising:
   an energy reserve, which provides electrical energy for the triggering; and
   a control circuit;
   wherein:
      the control circuit:
         forms, from the electrical energy, at least one firing pulse for the triggering of the personal protection arrangement, a first firing pulse amplitude and a first firing pulse duration of the at least one firing pulse being dependent on the personal protection arrangement to be triggered;
         in a first time interval, specifies the at least one firing pulse at a second firing pulse amplitude and a second firing pulse duration; and
         in a second time interval following the first time interval, specifies the at least one firing pulse at a third firing pulse amplitude and a third firing pulse duration;
      the second firing pulse amplitude is greater than the third firing pulse amplitude;
      the second firing pulse duration is shorter than the third firing pulse duration;
      the first time interval is used for triggering a first personal protection arrangement; and
      the second time interval is used for triggering a second personal protection arrangement.

2. The control device of claim 1, wherein the control circuit includes data that specify the first time interval and the second time interval.

3. The control device of claim 2, wherein the data assign the first time interval to the first personal protection arrangement and the second time interval to the second personal protection arrangement.

4. The control device of claim 3, wherein the data are permanently stored or are generated as a function of a triggering decision.

5. A method for triggering a personal protection arrangement for a vehicle, the method comprising:
   providing an energy reserve for providing electrical energy for the triggering; and
   using a control circuit to form, from the electrical energy, at least one firing pulse for the triggering of the personal protection arrangement, a first firing pulse amplitude and a first firing pulse duration of the at least one firing pulse being dependent on the personal protection arrangement to be triggered;
   wherein:
      the control circuit specifies the at least one firing pulse in a first time interval at a second firing pulse amplitude and a second firing pulse duration, and, in a second time interval following the first time interval, at a third firing pulse amplitude and a third firing pulse duration;
      the second firing pulse amplitude is greater than the third firing pulse amplitude;
      the second firing pulse duration is shorter than the third firing pulse duration;
      the first time interval is used to control a first personal protection arrangement; and
      the second time interval is used to control a second personal protection arrangement.

6. The method of claim 5, wherein the first time interval and the second time interval are specified by data in the control circuit.

7. The method of claim 6, wherein the data assign the first time interval to the first personal protection arrangement, and the second time interval to the second personal protection arrangement.

8. The method of claim 6, wherein the data are permanently stored or are generated as a function of a triggering decision.

* * * * *